(12) United States Patent
Clark et al.

(10) Patent No.: US 7,277,908 B2
(45) Date of Patent: Oct. 2, 2007

(54) NUMERIC PROCESSOR, A NUMERIC PROCESSING METHOD, AND A DATA PROCESSING APPARATUS OR COMPUTER PROGRAM INCORPORATING A NUMERIC PROCESSING MECHANISM

(75) Inventors: David J Clark, Warwick (GB); Michael F Cowlishaw, Coventry (GB)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 10/319,270

(22) Filed: Dec. 13, 2002

(65) Prior Publication Data
US 2003/0187897 A1    Oct. 2, 2003

(30) Foreign Application Priority Data
Mar. 27, 2002    (GB) .................................. 0207179.3

(51) Int. Cl.
*G06F 7/52* (2006.01)
(52) U.S. Cl. ..................................... 708/650
(58) Field of Classification Search ................ 708/504, 708/650, 651, 652, 653, 655, 656
See application file for complete search history.

(56) References Cited

U.S. PATENT DOCUMENTS

| | | | | |
|---|---|---|---|---|
| 5,132,925 A | * | 7/1992 | Kehl et al. | 708/653 |
| 5,381,380 A | * | 1/1995 | Yoshida | 708/656 |
| 5,587,940 A | * | 12/1996 | Ferguson | 708/651 |
| 6,094,669 A | * | 7/2000 | Mahurin | 708/655 |
| 6,564,239 B2 | * | 5/2003 | Matson et al. | 708/605 |

\* cited by examiner

*Primary Examiner*—Chuong D. Ngo
(74) *Attorney, Agent, or Firm*—Martin J. McKinley; Dillon & Yudell LLP

(57) ABSTRACT

Provided are methods, computer programs and data processing apparatus using numeric processing. Firstly, a corrective mechanism enables a method for performing accurate integer divisions to be derived from an approximate division method which does not, of itself, always produce an accurate result but for which the range of errors is known. By applying the corrective mechanism to a suitable approximate division method, a numeric processor or software-implemented numeric processing mechanism implementing the invention can perform the integer division operation efficiently. Secondly, an approximate division method which uses only rapid operations for fast integer division, and which has only a small possible range of errors, is used to enable the correction method to be completed rapidly. This addresses problems encountered when attempting to apply known methods to the task of performing integer division by large divisors or in a limited-size numeric register, and can provide efficiency improvements for a wide range of data processing systems and applications of those systems.

4 Claims, 3 Drawing Sheets

```
LET D be the divisor
LET EQ be the estimated quotient
LET ER by the estimated remainder

SET Q = EQ
SET R = ER

WHILE (ER < 0) DO
    SET Q = Q - 1
    SET R = R + D
END WHILE

WHILE (ER >(D-1)) DO
    SET Q = Q + 1
    SET R = R - D
END WHILE
```

FIG. 2

CHOOSE integer A > 0
LET D be the divisor
SET F = ceil( (2^A) / D)
LET X be the integer value to be divided by the divisor
SET Q = (X*F) DIV (2^A)

FIG. 3

LET D be the divisor
LET EQ be the estimated quotient
LET ER by the estimated remainder

SET Q = EQ
SET R = ER

WHILE (ER < 0) DO
   SET Q = Q - 1
   SET R = R + D
END WHILE

WHILE (ER >(D-1)) DO
   SET Q = Q + 1
   SET R = R - D
END WHILE

FIG. 4

CHOOSE integer A >= 0
CHOOSE integer B > 0
LET D be the divisor
SET F = ceil( (2^(A+B)) / D)
LET X be the integer value to be divided by the divisor
SET EQ = ( (X DIV (2^A)) *F) DIV (2^B)

FIG. 5

CHOOSE integer A >= 0
CHOOSE integer B > 0
CHOOSE integer C >= 0
LET D be the divisor
SET F = ceil( (2^(A+B)) / D) - C
LET X be the integer value to be divided by the divisor
SET EQ = ( (X DIV (2^A)) *F) DIV (2^B)

FIG. 6

```
// on entry, X contains the value to be converted unsigned Q;                    // estimated quotient [88.9% correct]
unsigned R;                    // corresponding remainder

Q = (( X>>11) *53687)>>18;
R=X - (Q * 10000);

if (R >=10000)                 // estimate was incorrect (-1)
{
   Q++;
   R -= 10000;
}

// on exit, Q contains the high digit and R the low digit
```

NUMERIC PROCESSOR, A NUMERIC PROCESSING METHOD, AND A DATA PROCESSING APPARATUS OR COMPUTER PROGRAM INCORPORATING A NUMERIC PROCESSING MECHANISM

FIELD OF INVENTION

The present invention relates to a method, a computer program and a data processing apparatus using numeric processing. The invention can be implemented in a numeric processor or a set of computer program instructions for controlling a numeric processor.

BACKGROUND OF THE INVENTION

Arithmetic operations are used within many types of computing system, and can often represent a key part of the processing being performed by the system. For this reason, efficient mechanisms for carrying out various types of mathematical operation are sought, and because of the very large numbers of operations carried out by some computing systems it is possible for quite modest improvements in the efficiency of such mechanisms to produce very significant performance improvements overall. These mechanisms can be implemented in electronic circuitry, and incorporated into the microprocessors used in central processing units or auxiliary numeric processors in computing systems. These mechanisms can also be implemented in software, in which case the programming language used makes available the basic operations which a processor is able to carry out.

FIG. 1 shows a typical numeric processor mechanism found in computing systems. This mechanism comprises: (1) a sequence of instructions, which may be incorporated into the design of the mechanism but are more commonly supplied to the mechanism in the form of an executable program of instructions; (2) an instruction pointer, which indicates which instruction is to be processed next; (3) a processor which incorporates a range of basic numeric operations, and which is capable of reading the instruction at the instruction pointer and processing it; (4) some local storage in which can be stored the values which the numeric processor is working on, and the results of the operations it carries out. The types of instruction which can be included in the sequence of instructions (1) will vary from device to device, but typically include some instructions for loading particular values into the numeric registers (4), some instructions for performing operations on one or more values in the numeric processor (3), and some instructions which can modify the instruction pointer (2) in order to enable branching and looping within the sequence of instructions.

Arithmetic operations within computing systems are typically carried out by numeric processors operating with binary (base 2) arithmetic. Base 2 arithmetic is well adapted for implementing in electronic circuitry or in microprocessor designs. However, base 2 arithmetic is poorly adapted to modelling many users' applications of arithmetic, both because users are not accustomed to supplying or interpreting base 2 values and also because certain precision and rounding behaviours which occur in traditional base 10 arithmetic are difficult to model in base 2. Therefore, modern computing systems are increasingly required to perform conversions between the base 2 representations used internally and the base 10 representations used by the users, and to simulate the performing of arithmetic operations in base 10 while still using a base 2 arithmetic unit.

Values represented in base 10 can readily be converted to base 2 with a sequence of integer multiplication and additions, which are relatively rapid operations, and this can be carried out efficiently by a mechanism such as that shown in FIG. 1. However, converting a value represented in base 2 to a representation in base 10 normally requires integer division (including collection of the remainder) of values by 10, or by various powers of 10 depending on the representation being used. General integer division is a relatively lengthy process, even when the numeric processor's arithmetic unit provides a suitable integer division operation which can be used directly. It is not uncommon for a general integer division operation to take in excess of forty times as long as an addition operation.

Implementors of arithmetic computing systems have therefore sought methods for performing particular division operations in more rapid ways. Division by a power of 2 is normally a trivial and very rapid operation on a base 2 arithmetic numeric processor. Methods for performing divisions by other values have also been devised. They are known to one skilled in the art, and are described in the relevant literature.

FIG. 2 illustrates such a method to perform the integer division of an integer value. In FIG. 2 and elsewhere in this document, the following notation is used:

ceil (x) denotes the smallest integer greater than or equal to x floor (x) denotes the largest integer less than or equal to x x+y denotes x plus y x−y denotes x minus y x*y denotes x multiplied by y x/y denotes x divided by y x DIV y denotes the result of the integer division of x by y, equal to floor (floor(x)/floor(y))

x^y denotes x raised to the power y for a non-negative integer y log2(x) denotes the logarithm to base 2 of x for x>=1, i.e. the value y for which x=2^log2(y)

The method of FIG. 2 accomplishes the division by multiplying the integer value by an integer factor and then dividing the result by a power of 2 (i.e. 2^A). Both of these operations are rapid, so the method is generally effective. However, the result is only accurate for a certain range of input values X and integer values A. In general, the larger the value chosen for A, the greater the range of input values X for which the correct result Q is generated, but also the greater the value of the intermediate result (X*F) and thus The larger the numeric register required to apply the method. If the size of the numeric register is subject to a fixed limit, as is often the case, and the intermediate results are to be accommodated within the register, then this limits the size of the value which can be chosen for A. To apply this method successfully, the best value of A must be chosen for the needs of the application. For example, when D is 10, and choosing A to be 19, this method can correctly divide all 16-bit base 2 (unsigned) values by 10, performing the calculation in a 32-bit base 2 (unsigned) numeric register.

However, a method such as that shown in FIG. 2 becomes unusable when it is impossible to reconcile the competing requirements of extending the range of input values for which the method is accurate while being able to perform the calculation in a certain size of numeric register. This becomes a particularly difficult problem to avoid when attempting to devise methods to perform integer divisions by large divisors.

SUMMARY OF THE INVENTION

Methods, apparatus and computer programs according to a first aspect of the present invention include a corrective mechanism which enables a method for performing accurate integer divisions to be derived from an approximate division method which does not, of itself, always produce an accurate result but for which the range of errors is known. By applying the corrective mechanism of the invention to a suitable approximate division method, a numeric processor or software-implemented numeric processing mechanism implementing the invention can perform the integer division operation efficiently.

The invention addresses problems encountered when attempting to apply the known methods to the task of performing integer division by large divisors or in a limited-size numeric register, and can provide efficiency improvements for a wide range of data processing systems and applications of those systems.

According to a first aspect of the invention, there is provided a method and mechanism for detecting that the result produced by an approximate division method is wrong in a particular case, and for determining an appropriate correction to apply. The invention provides apparatus, methods and a numeric processing mechanism for use within a data processing apparatus, comprising: logic for performing an approximate integer division to generate an estimated quotient result (EQ); logic for computing an estimated remainder (ER) of the division, using said generated result (EQ); logic for comparing the computed remainder with an upper and lower limit for valid remainders; logic, responsive to a valid result of said comparison, for outputting the estimated quotient result (EQ); and logic, responsive to an invalid result of said comparison, for incrementing or decrementing the value of the estimated quotient result (EQ) and correspondingly decrementing or incrementing the value of the computed remainder (ER) and then triggering a repeat of the comparison, until the computed remainder (ER) is between the upper and lower limit for valid remainders.

The phrase 'numeric processing mechanism' as used herein in the context of the present invention includes a software-implemented numeric processing mechanism comprising a sequence of instructions for controlling a numeric processor and a hardware-implemented numeric processor including electronic circuitry. The term 'logic' includes program code implementations as well as electronic circuitry implementations.

Preferably, the approximate division method operates on a dividend X divided by a non-zero divisor D to produce an estimated quotient EQ. The correction method computes the corresponding remainder ER according to the formula:

$$ER = X - (EQ * D)$$

and uses this to compute the appropriate correction. For a non-negative dividend X, the true remainder should be in the range 0 through (D−1). An estimated remainder ER greater than (D−1) indicates that EQ is smaller than the true quotient, while an estimated remainder ER less than 0 indicates that EQ is larger than the true quotient. This information is used to bring the estimated quotient repeatedly closer to the true quotient. FIG. 3 shows a method to compute the 'true' quotient Q and 'true' remainder R using the estimated quotient EQ and corresponding remainder ER derived from an approximate division method. This correction mechanism may be applied to the resultant EQ and ER of one of a plurality of different approximate division methods.

According to a second aspect of the invention, an approximate division method which uses only rapid operations for fast integer division, and which has only a small possible range of errors, is used to enable the correction method to be completed rapidly. The desired operation which must be performed by a numeric processor mechanism is decomposed into a sequence of simpler operations which can be performed efficiently by the mechanism, and this is implemented either in a set of program instructions for controlling a standard numeric processor or in a new numeric processor design. In either case, a numeric processing mechanism according to the invention enables this sequence of simpler operations to be processed so as to achieve a more efficient performance of mathematical operations than was previously possible.

In particular, in an approximate division method according to a preferred embodiment of the invention, wherein performing an integer division includes a step of dividing an intermediate result by a power of 2 (i.e. 2 raised to the power A, where A is a non-negative integer), the step of dividing by a power of 2 is performed in at least two parts to reduce the size of the arithmetic register which is required to apply the method. FIG. 4 shows an approximate integer division method according to a first embodiment of the invention.

The invention according to this second aspect is especially useful when dividing an input value by a large integer divisor which is a power of 10, such as when converting a value represented in base 2 to a representation in base 10. Although the approximate division method and the correction method together can amount to a considerable number of computational operations to be performed by the numeric processor, the resulting mechanism is effective because each of the operations is rapid compared to the time required to complete a general integer division operation within the numeric processor.

In one embodiment of the invention, the approximate division method is chosen to produce an estimated quotient which is accurate to within +/−1 of the true quotient for the required range of input values. The correction method can be simplified to apply simple tests to the estimated remainder.

In a further embodiment, the approximate division method is chosen to produce an estimated quotient which is either equal to or one greater than the true quotient, or equivalently to produce an estimated quotient which is either equal to or one less than the true quotient. The correction method can be further simplified to apply just one test to the estimated remainder.

Preferably, the approximate division method is chosen so as to minimize the percentage of input values for which the approximate division method produces an incorrect result. This ensures that the method performs well over a spread of input values. Nevertheless, the correction method according to the first aspect of the invention can be used with a wide range of approximate division methods.

Further modifications of the methods shown in FIGS. 2 and 4, and of other methods known in the art, may readily be made for use with a corrective mechanism according to the invention.

The invention can be applied as a software method, for a developer of class libraries or application code performing binary-to-decimal conversions. In this case, the compiler or interpreter furnished by the software programming environment can be used to convert the chosen approximate division method, together with the correction method, into a sequence of instructions suitable for processing by a numeric processor contained in the processing environment for which the software programming environment is designed.

However, the invention is equally applicable directly to hardware design for an enhanced numeric processing unit designed to perform decimal (or pseudo-decimal) operations. In this case, the sequence of instructions will either be incorporated into the hardware as micro code or built into the circuitry of the numeric processor itself, using techniques of circuitry and processor design which are well known in the art. The invention would be particularly applicable to a design for a processor which was to offer binary to decimal conversions as well as operations performed in decimal rather than (or as well as) binary arithmetic.

In further aspects, the invention provides a method for automated integer division using a numeric processor and a method for performing automated conversion of an input data value from a binary (base 2 arithmetic) representation which is suitable for numeric processing within a data processing apparatus, to a decimal (base 10 arithmetic) representation suitable for easier user interpretation.

BRIEF DESCRIPTION OF DRAWINGS

Implementations and applications of the invention in accordance with preferred embodiments will now be described in more detail, by way of example, with reference to the accompanying drawings in which:

FIG. 2 shows a first method for performing integer division of an integer value using only rapid operations, but which only achieves accurate results for a certain range of input values;

FIG. 3 shows a method for computing a true quotient Q and a true remainder R from an estimated quotient EQ and estimated remainder ER, according to an embodiment of a first aspect of the invention;

FIG. 4 shows a second method for performing approximate integer division of an integer value, according to a second aspect of the invention;

FIG. 5 shows an improved method for performing approximate integer division of an integer value in accordance with the second aspect of the invention; and FIG. 6 shows a computer program code routine in the 'C' programming language, for converting a value in the range 0-99999999 to high and low digits in base 10000, according to an embodiment of the invention.

DETAILED DESCRIPTION OF PREFERRED EMBODIMENTS

Figure 1:
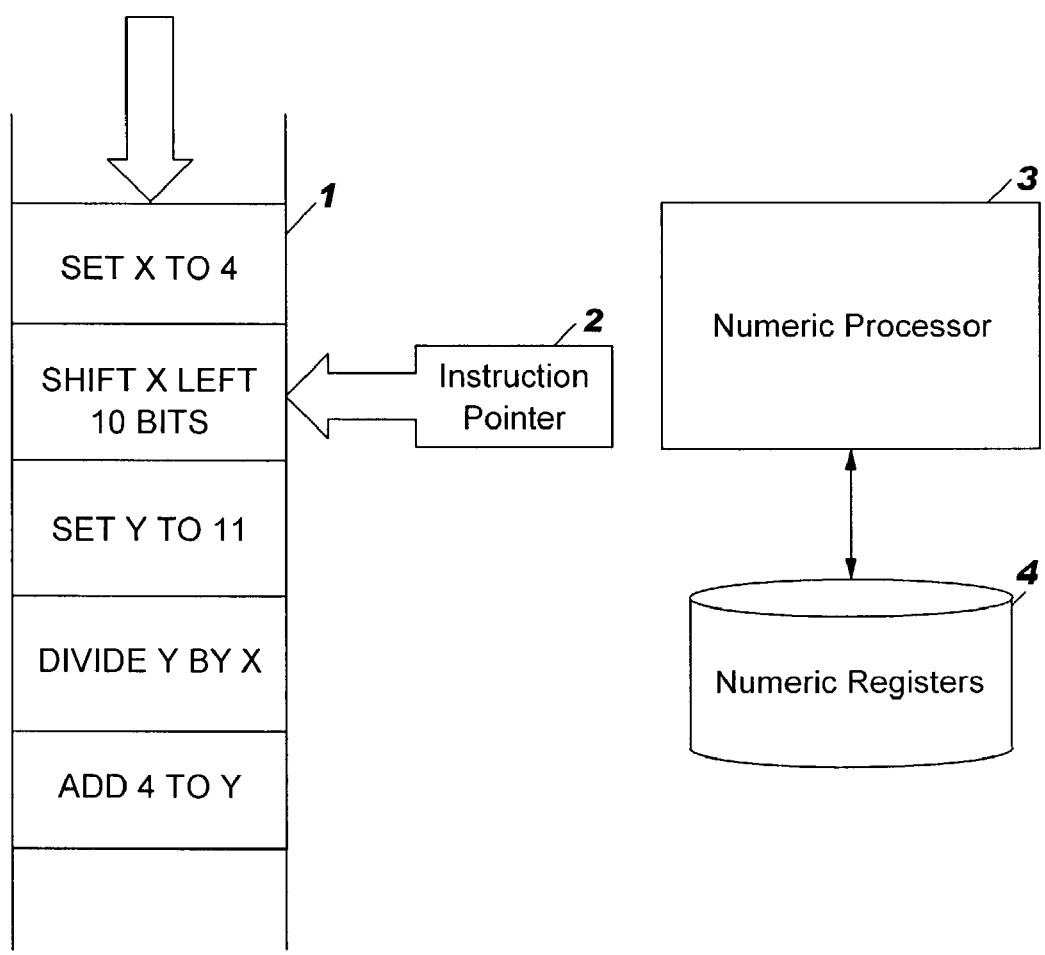
FIG. 1 is a schematic representation of a typical numeric processor mechanism.

The invention provides a mechanism for performing certain types of mathematical operation, particularly for performing an integer division rapidly. The invention can be implemented as a standard numeric processor mechanism together with a method for decomposing the desired operation into a sequence of much simpler operations whose implementation is well known and which are performed efficiently by the mechanism. The invention uses the sequence of simpler operations to adapt the standard numeric processor mechanism in order to perform the desired operation significantly more efficiently than was previously possible.

One stage of the invention according to the preferred embodiment involves detecting that the result produced by an approximate division method is wrong in a particular case, and for determining an appropriate correction to apply. The approximate division method operates on a dividend X divided by a divisor D to produce an estimated quotient EQ. The correction method computes the corresponding remainder ER according to the formula:

$$ER = X - (EQ * D)$$

and uses this to compute the appropriate correction. For a non-negative dividend X, the true remainder should be in the range 0 through (D−1). An estimated remainder ER greater than (D−1) indicates that EQ is smaller than the true quotient, while an estimated remainder ER less than 0 indicates that EQ is larger than the true quotient. This information is used to bring the estimated quotient repeatedly closer to the true quotient. FIG. 3 shows a method to compute the 'true' quotient Q and 'true' remainder R using the estimated quotient EQ and corresponding remainder ER derived from an approximate division method. This correction mechanism may be applied to the resultant EQ and ER of one of a plurality of different approximate division methods. The steps of the method of FIG. 3 are repeated here for ease of reference:

LET D be the divisor
LET EQ be the estimated quotient
LET ER be the estimated remainder
SET Q=EQ
SET R=ER
WHILE (ER<0) DO

SET $Q=Q-1$

SET $R=R+D$

END WHILE
WHILE (ER>(D−1)) DO

SET $Q=Q+1$

SET $R=R-D$

END WHILE

In a separate stage of implementing the invention, the approximate division method is designed to use only operations which can be performed rapidly, and to have only a small range of possible errors. This allows the correction method to be completed rapidly. The desired operation which must be performed by a numeric processor mechanism is decomposed into a sequence of simpler operations which can be performed efficiently by the mechanism, and the mechanism is adapted to perform this sequence of operations for a more efficient processing of mathematical operations than was previously possible.

In particular, in an approximate division method according to a preferred embodiment of the invention, wherein performing an integer division includes a step of dividing an intermediate result by a power of 2 (i.e. 2 raised to the power A, where A is a non-negative integer), the step of dividing by a power of 2 is performed in at least two parts to reduce the size of the arithmetic register which is required to apply the method.

FIG. 4 shows an approximate division method according to a preferred embodiment of the invention. The steps of this method are repeated here for ease of reference:

CHOOSE integer A>=0
CHOOSE integer B>0
LET D be the divisor
SET F=ceil((2^(A+B))/D
LET X be the integer value to be divided by the divisor
SET EQ=((X DIV (2^A))* F) DIV (2^B)

This method adapts the method shown in FIG. 2 by decomposing the division by a power of 2 into two parts, one of which is performed before the multiplication by F and the other of which is performed afterward. In this adapted method, the larger the value chosen for (A+B), the greater the range of input values X for which a reasonably accurate result EQ is generated, while the larger the value chosen for A, for a particular value of (A+B), the smaller the size of the arithmetic register required to apply the method. However, increasing A also introduces error into the result generated. To apply this method successfully, the best values of A and B must be chosen for the needs of the application. For example, when D is 10000, and choosing A to be 7 and B to be 21, this method can divide all 24-bit base 2 (unsigned) values by 10000, performing the calculation in a 32-bit base 2 (unsigned) arithmetic register, and generating for each input value a result which is either the true quotient or just one greater than the true quotient. These results can then readily be made exact by applying the corrective mechanism described by the invention. For this range of input values, by contrast, the method shown in FIG. 2 would require a 45-bit base 2 (unsigned) arithmetic register to perform the calculation when D is 10000 (choosing A to be 34).

Although the approximate division method and the correction method together can amount to a considerable number of computational operations to be performed by the numeric processor, the resulting mechanism is effective because each of the operations is rapid compared to the time required to complete a general integer division operation within the numeric processor.

The invention has been applied to the problem of converting a value in the range 0-99999999 into two base 10000 "digits", each in the range 0-9999, on an numeric processor which uses 32-bit (unsigned) binary (base 2) numeric registers. This requires an integer division by 10000 to be performed, without exceeding the capacity of a 32-bit numeric register with any intermediate results. In this case, the method shown in FIG. 2 would have required A to be 40 to ensure that the correct result was generated for all values in the input range, and a numeric register of at least 54 bits (unsigned) would have been required to contain the intermediate result (X*F).

FIG. 5 shows an improved approximate division method according to an embodiment of the invention, in which the value of C may be adjusted to minimize the percentage of input values for which the approximate division method produces an inaccurate result. The method of FIG. 5 is repeated below for ease of reference:

CHOOSE integer A>=0
CHOOSE integer B>0
CHOOSE integer C>=0
LET D be the divisor
SET F=ceil((2^(A+B))/D)−C
LET X be the integer value to be divided by the divisor
SET EQ=((X DIV (2^A))*F) DIV (2^B)

The following procedure can be used to find suitable values for A, B and C in the method of FIG. 5, given the range of input values to be used with the method and the number of bits available in base 2 (unsigned) numeric registers in which the intermediate results are to be stored:

The aim is to use the largest possible value for A+B, but within that to use the smallest possible value for A (in order to minimise the inaccuracy of EQ) which still allows all intermediate results to be accommodated within the available base 2 (unsigned) numeric register size. For a given size of register, when A+B becomes too large the necessary minimum value for A will be so large that the integer division of X by (2^A) will result in zero for all values of X in the range (this occurs when A >log2(M)), and this therefore bounds the ranges of possible values for A, B, C which should be tried to find good combinations.

LET D be the divisor to be applied.

LET M be the maximum magnitude of value which is to be used as a value X with this method.

LET N be the number of bits in the base 2 (unsigned) numeric registers within which intermediate results must be contained.

SET S=1+floor(log2(D)), which is the smallest value for A+B which gives F>1

FOR each value of S

SET TF=*ceil*((2^S)/D)

SET A=*ceil*(log2(M/((2^N)DIV TF))), unless the argument to the log2 function is less than 1 in which case SET A=0

SET B=S−A

SET C=0

FOR each value of C

Apply the method to all values in the required range using this combination of values for A, B, C, and collect all the errors which occur between the estimated quotient (EQ) and the actual quotient.

Note the pool of distinct errors which occur, and the percentage of values which give rise to each distinct error amount, for this combination of values for A, B, C

SET C=C+1

REPEAT until the pool of distinct errors produced by this value of C is larger than for the previous value of C tried

SET *S*=*S*+1

REPEAT until the computed value for A is larger than log2(M)

Now review the combinations of values for A, B, C which were tried, and the size of the pool of distinct errors produced for each combination of values, and the percentage of values which give rise to each distinct error amount. Select values A, B, C which give the best outcome. Preferably, the pool of distinct errors will comprise only a small number of distinct error amounts, ideally as few as two, and the error amount of zero (no error) will occur for a large percentage of the values.

This method has been used, for example, when D is 10000, and choosing A to be 11 and B to be 18 and C to be 1, to generate for each input value a result which is either the true quotient or just one less than the true quotient, performing the calculation in a 32-bit base 2 (unsigned) numeric register. In this case, 88.9% of the input values yield the true quotient directly. In particular, when M=99999999 and D=10000 and we wish to use 32-bit base 2 (unsigned) numeric registers, we begin searching from S=14 upwards and stop searching when S=45 (because at S=45, A=27, and the division of all values in the range 0-99999999 by (2^27) results in zero). Among the combinations of values we consider, we find that at S=29 we have TF=53688, A=11, B=18, which has a particularly small pool of errors (just two distinct error amounts) when C=1, with the error amount of zero occurring for 88.9% of the values from 0-99999999.

This combination of values (A=11, B=18, C=1) will therefore be used below by way of example.

The invention has been implemented in a routine written in the 'C' programming language, as shown in FIG. 6, using the selected values (A=11, B=18, C=1) from the above example. On entry to the routine, the variable X contains the input value in the range 0-99999999. On exiting the routine, the variable Q contains the "high digit" (the quotient upon dividing X by 10000) while the variable R contains the "low digit" (the remainder upon dividing X by 10000). A standard 'C' language compiler is then used to translate this routine into the sequence of instructions to be supplied to the numeric processor. It is supposed that the computing system and 'C' compiler used provide for the "unsigned" type to be an unsigned integer of at least 32 bits. 'C' language compilers are available for a very wide range of numeric processor systems, but in one application of the embodiment a 'C' language compiler was used to produce a sequence of instructions suitable for processing by an Intel Corporation Pentium III (RTM) microprocessor incorporated into a conventional personal computer. This type of microprocessor incorporates a general integer division operation, but it was noted that the invention was able to produce the results of the required division operation in under half the time (measured in cycles of the microprocessor) required by the general integer division operation of the microprocessor. In a numerically intensive processing environment, this has resulted in a very significant performance increase.

The routine of FIG. 6 is repeated below for ease of reference:

```
// on entry, X contains the value to be converted
    unsigned Q;              // estimated quotient [88.9% correct]
    unsigned R;              // corresponding remainder
    Q = ( (X >> 11) * 53687) >> 18;
    R = X - (Q * 10000) ;
    if (R >= 10000)          // estimate was incorrect (-1)
    {
        Q ++;
        R -= 10000;
    }
// on exit, Q contains the high digit and R the low digit.
```

In the above example 'C' routine, '>>' performs a bit-wise binary shift right by the specified number of bits. This is a very fast way to divide by a power of 2 when using binary arithmetic. The line "Q=((X>>11)* 53687)>>18" therefore implements the line "SET EQ=( (X DIV (2^A))* F ) DIV (2^B)" from FIG. 5, with A=11, B=18, C=1, and therefore F=53687. The next line, "R=X−(Q*10000)", implements the formula "ER=X−(EQ*D)" mentioned elsewhere in this document. Since the inventors have found that for these values of A, B, C and for input values in the required range 0-99999999, the estimated quotient is always either exact or under by exactly one, the correction method can be reduced to a single test for an excessive remainder: '>=' performs a "greater-than-or-equal" comparison test. '++' performs an increment operation (adding of one), so that "Q++" implements the line "SET Q=Q+1" from FIG. 3. Finally, the line "R−=10000" causes 10000 to be subtracted from R, and thus implements the line "SET R=R−D" from FIG. 3.

The present invention is widely applicable for improving data processing performance by enabling efficient and accurate floating-point and fixed-point decimal arithmetic calculations, and in particular for use with database management software in view of the very large number of calculations which must be performed for typical database applications. For each numeric processing operation according to the invention, data is extracted from a database repository, processed as described above, and then stored once again in a database repository.

The invention provides advantages for applications as wide ranging as telecommunications, airline systems, banking and financial analysis, insurance, inventory control, management reporting, marketing services, order entry, order processing, pharmaceutical applications, and retail sales.

What is claimed is:

1. A computer-implemented method for increasing a data processing apparatus's efficiency for applying an appropriate correction when an approximate division operation executed in the apparatus produces an incorrect answer, the computer-implemented method comprising:
   producing an estimated quotient by dividing a dividend X by a divisor D to produce an estimated quotient EQ;
   producing a corresponding estimated remainder ER according to a formula ER=X−(EQ*D); and
   in response to determining that the estimated remainder is outside a range between zero and (D−1), computing a true quotient Q and a true remainder R by using the value of EQ for Q and the value of ER for R in an iterative fashion until R is within the range of zero and (D−1), wherein said steps of producing and computing cause the data processing apparatus to more efficiently perform the appropriate correction.

2. The computer implemented method of claim 1, further comprising:
   storing Q and R in a database repository that is used by a software program that is selected from a group consisting of telecommunications applications, insurance software, inventory control software, order processing software, and retail sales software.

3. The computer implemented method of claim 1, wherein the approximate division operation is limited to pro-determined division operations that have a small range of possible errors to the estimated remainder ER.

4. A computer implemented method for improving data processing performance of a data processing system when executing a database management software, the computer implemented method comprising:
   storing, into a data processing system, computer executable instructions that, when processed by a database management software that is being executed by the data processing system, cause the database management software to:
   produce an estimated quotient by dividing a dividend X by a divisor D to produce an estimated quotient EQ;
   produce a corresponding estimated remainder ER according to a formula ER=X−(EQ*D);
   in response to determining that the estimated remainder is outside a range between zero and (D−1), compute a true quotient Q and a true remainder R by using the value of EQ for Q and the value of ER for R in an iterative fashion until R is within the range of zero and (D−1); and
   store Q and R in a database repository that is used by the database management software, wherein said producing, said computing, and said storing cause the data processing system to more efficiently execute the data base management software.

* * * * *